W. Miller.

Elevator.

No. 3,928. Reissued Apr. 19, 1870.

Witnesses:
James H. Layman
C. L. Fisher.

Inventor:
W. Miller
By Knight Bros
Attys.

United States Patent Office.

WILLIAM MILLER, OF CINCINNATI, OHIO.

*Letters Patent No.* 48,579, *dated July* 4, 1865; *reissue No.* 2,066, *dated September* 5, 1865; *reissue No.* 3,922, *dated April* 19, 1870.

IMPROVED HOISTING-MACHINE.

The Schedule referred to in these Letters Patent and making part of the same.

*To all whom it may concern:*

Be it known that I, WILLIAM MILLER, of Cincinnati, Hamilton county, Ohio, have invented a new and useful Improvement in Hoisting-Machines or Elevators; and I do hereby declare the following to be a full, clear, and exact description thereof, reference being had to the accompanying drawings making part of this specification.

The present invention relates to an improvement in the device patented to me on the 12th day of May, 1863, and consists in a more simple, secure, and efficient adaptation of the worm principle to an elevator or hoisting-platform.

Figure 1:
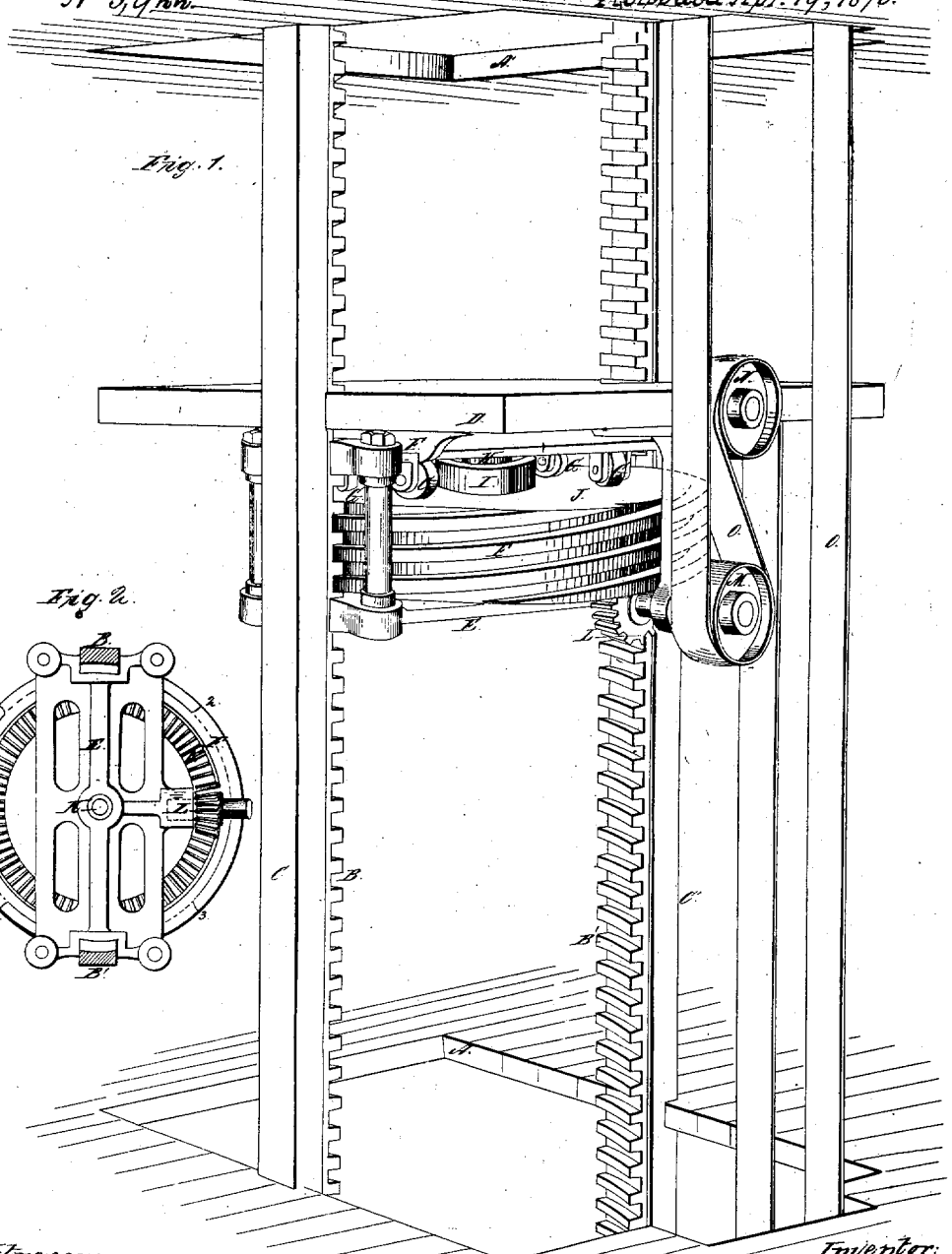
Figure 1 is a perspective view of a portion of a hoisting-machine included between the consecutive floors.
Figure 2:
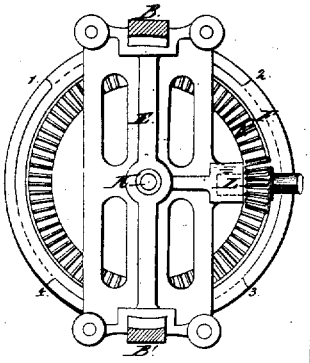
Figure 2 is a transverse section below the platform, and looking upward.

A and A′ represent customary hatchways flanked by worm-racks or segmental nuts B B′, which extend vertically from the lowest to the highest floor, and which are firmly secured to, and supported by suitable stanchions C C′.

D is a platform, to which is attached a suitable frame or housing, E, containing a large worm-wheel, F, which meshes equally in both racks B B′.

The weight of the platform is received directly by the worm-wheel near the margin of the latter, through the medium of rollers G, whose bearings depend either from the platform or from the upper part of the housing E.

The worm-wheel F has a hub, I, which is connected to the outer ring or margin of the wheel by a light plate, J, or by spokes.

The hub I is secured to a shaft or axis, H, journalled vertically in the frame E.

The duty of the shaft H is merely to hold the worm to its proper central position between the racks, the worm itself being supported wholly by the racks.

The worm F has on its under side a bevel wheel, K, which receives a driving-pinion, L, journaled horizontally in the frame E, and having a pulley, M, around which, and another pulley, N, the endless driving-belt O is wrapped.

A great practical advantage incident to the use of the single worm-wheel meshing in two or more screw-racks or segmental nuts consists in the perfect equality of strain and bearing, and in the direct transmission of pressure from the platform through the rollers and worm to the racks, and also in freedom from the strain and displacement to which the journals of small and separate worm-wheels are liable.

Another obvious advantage is that each revolution of the worm may be made to produce a more rapid ascent or descent of the platform with a less abrupt pitch or declivity of the thread.

An inferior modification of my device may have the platform D supported upon the worm F through the medium of a rim or circular flange, in place of the rollers G.

Still another modification may consist in substituting worm-gearing for the bevel wheel K and pinion L.

I claim herein as new, and of my invention—

1. An elevator or hoisting-machine whose platform is sustained by a single traveling worm-wheel adapted to span the hatchway.

2. Elevating or depressing the platform of an elevator or hoisting-machine by means of a single traveling worm-wheel which meshes within two or more corresponding screw-racks or segmental nuts.

3. An elevator platform supported by rollers G, or their equivalent, on a single worm-wheel resting in worm-racks or segmental nuts, substantially as set forth.

WILLIAM MILLER.

Witnesses:
S. S. MORRIS,
JAMES MOORE.